United States Patent
Li

(10) Patent No.: US 9,188,819 B2
(45) Date of Patent: Nov. 17, 2015

(54) LIQUID CRYSTAL DISPLAY AND APPARATUS

(71) Applicant: SHENZHEN CHINA STAR OPTOELECTRONICS TECHNOLOGY CO., LTD., Shenzhen (CN)

(72) Inventor: Quan Li, Shenzhen (CN)

(73) Assignee: SHENZHEN CHINA STAR OPTOELECTRONICS TECHNOLOGY CO. LTD., Shenzhen (CN)

( * ) Notice: Subject to any disclaimer, the term of this patent is extended or adjusted under 35 U.S.C. 154(b) by 34 days.

(21) Appl. No.: 14/233,766

(22) PCT Filed: Nov. 6, 2013

(86) PCT No.: PCT/CN2013/086592
§ 371 (c)(1),
(2) Date: Jan. 20, 2014

(87) PCT Pub. No.: WO2015/062114
PCT Pub. Date: May 7, 2015

(65) Prior Publication Data
US 2015/0116614 A1    Apr. 30, 2015

(30) Foreign Application Priority Data
Oct. 29, 2013 (CN) .......................... 2013 1 0521656

(51) Int. Cl.
*G02F 1/1345* (2006.01)
(52) U.S. Cl.
CPC .................. *G02F 1/13452* (2013.01)
(58) Field of Classification Search
CPC ............ H01L 2924/14; H01L 2924/1815; H01L 2224/0603; H01L 2224/1403; H01L 2224/16; H01L 24/50; H01L 25/0756; H01L 23/49838; H01L 23/5386; G02F 1/1345; G02F 1/13452; G02F 1/13458; G02F 1/13454; G01F 2001/13456; G01F 2001/133388; G06F 13/4072; B41J 2002/14491; B41J 2/14233; B41J 2/1404; H05K 5/02; H05K 1/0271; H05K 1/028; H05K 1/147; H05K 1/189; H05K 2201/09672; H05K 2201/10136; H05K 2203/175; H05K 3/4092; G09G 2310/0275; G09G 3/3275
USPC ........... 257/E25.021, E23.175, 676, E23.065, 257/E23.067, 784, 786; 349/149, 150, 152, 349/151, 158; 345/204, 156, 80; 361/749, 361/737
See application file for complete search history.

(56) References Cited

U.S. PATENT DOCUMENTS 5,737,272 A * 4/1998 Uchiyama et al. ............ 345/206
2010/0245299 A1    9/2010 Han et al.

FOREIGN PATENT DOCUMENTS

| CN | 1416309 A | 5/2003 |
|---|---|---|
| CN | 1959485 A | 5/2007 |
| JP | 2007134357 A | 5/2007 |
| KR | 20100108677 A | 10/2010 |

* cited by examiner

*Primary Examiner* — Thoi Duong
(74) *Attorney, Agent, or Firm* — Mark M. Friedman

(57) ABSTRACT

In the present invention, a plurality of connecting units are disposed between a driving circuit board and a liquid crystal panel, each of the connecting units comprises at least two chip tapes, and the two chip tapes are overlapped with each other and connected to the driving circuit board and the liquid crystal panel. The two chip tapes are commonly formed on one of the connecting units based on the design of the connecting units, so that the arrangement space of the chip tapes along an extending direction of the driving circuit board can be reduced.

7 Claims, 4 Drawing Sheets

LIQUID CRYSTAL DISPLAY AND APPARATUS

FIELD OF THE INVENTION

The present invention relates to a technology field of the liquid crystal display, and more particularly to a liquid crystal display and an apparatus thereof.

BACKGROUND OF THE INVENTION

With the continuous development of liquid crystal display (LCD) technology, the requirement of the components in the liquid crystal display is getting higher and higher.

The package structure of the chips on film (COF) of the prior art adopted the technology of the tape automated bonding (TAB) to heat and package driver chips, the driver chips are taped and delivered in a roil form. In operation, each of the COF package can be cut off in turn from the tape substrate, and electrically connected between a driving circuit board and a transparent circuit on a glass substrate of the liquid crystal panel. One or a plurality of COF packages can be provide between the driving circuit board and the transparent circuit. When the size of the liquid crystal panel is larger, the amount of the COF packages is more.

For example, referring to FIG. 1, FIG. 1 is a schematic view of a traditional liquid crystal display. The liquid crystal display comprises a driving circuit board 11, a LCD panel 13 and a plurality of chip tapes 12.

The chip tapes 12 are provided between the LCD panel 13 and the driving circuit board 11 to achieve the electrical signal conduction between the LCD panel 13 and the driving circuit board 11. With the technical requirements for high-resolution, the amount of the chip tapes 12 is more and more for driving liquid crystal panel, so that the chip tapes 12 are densely arranged on the source gate of the liquid crystal panel. For example, in FIG. 1, the chip tapes 12 are densely arranged along the extending direction of the driving circuit board 11, i.e. a transverse direction M', Mechanical design is thus restricted by numerous chip tapes 12, for example, the distribution of the mounting screws. In this case, the width of the terminals of the chip tapes 12 are limited by process, the bonding of the chip tapes 12 will be a problem and a bottleneck of developing the ultra-high-definition LCD panel.

Therefore, it is one of the research directions in the field of LCD panel technology to think how to reduce the occupied space of the chip tapes 12 along the transverse direction M' when the number of the chip tapes 12 are the same, in order to save the space for welding the chip tapes 12.

SUMMARY OF THE INVENTION

An object of the present invention is to provide a liquid crystal display, which is used to solve the technical problem that the amount of the chip tapes are large in the prior art and the chip tapes are densely arranged along the driving circuit board to restrict mechanical design.

To achieve the above object, the present invention provides a liquid crystal display which comprises:

a driving circuit board extending along a transverse direction;

a liquid crystal panel;

a plurality of connecting units disposed between the driving circuit board and the liquid crystal panel to connect with the driving circuit board and the liquid crystal panel, wherein each of the connecting units comprises:

at least two chip tapes being overlapped/covered with each other and connected to the driving circuit board and the liquid crystal panel, wherein each of the chip tapes has a different width along a longitudinal direction vertical to the transverse direction.

Another object of the present invention is to provide a liquid crystal display apparatus, which is used to solve the technical problem that the amount of the chip tapes are large in the prior art and the chip tapes are densely arranged along the driving circuit board to restrict mechanical design.

To achieve the above object, the present invention provides a liquid crystal display apparatus which comprises a liquid crystal display, wherein the liquid crystal display comprises:

a driving circuit board extending along a transverse direction;

a liquid crystal panel;

a plurality of connecting units disposed between the driving circuit board and the liquid crystal panel to connect with the driving circuit board and the liquid crystal panel, wherein each of the connecting units comprises:

at least two chip tapes being overlapped/covered with each other and connected to the driving circuit board and the liquid crystal panel, wherein each of the chip tapes has a different width along a longitudinal direction vertical to the transverse direction.

In comparison with the prior art, according to the present invention, a plurality of connecting units are disposed between the driving circuit board and the liquid crystal panel, and each of the connecting units comprises at least two chip tapes being overlapped/covered with each other and connected to the driving circuit board and the liquid crystal panel, wherein the at least two chip tapes are commonly formed on one of the connecting units based on the design of the connecting units, so that the arrangement space of the chip tapes along an extending direction of the driving circuit board can be reduced, and it can be facilitated to do other designs, for example, to weld the chip tapes or to add other apparatus.

The above-mentioned content of the present invention can be best understood by referring to the following detailed description of the preferred embodiments and the accompanying drawings.

DETAILED DESCRIPTION OF THE PREFERRED EMBODIMENTS

The following description of the embodiments with reference to the attached drawings, illustrates the present invention may be used to implement a particular embodiment.

Figure 1:
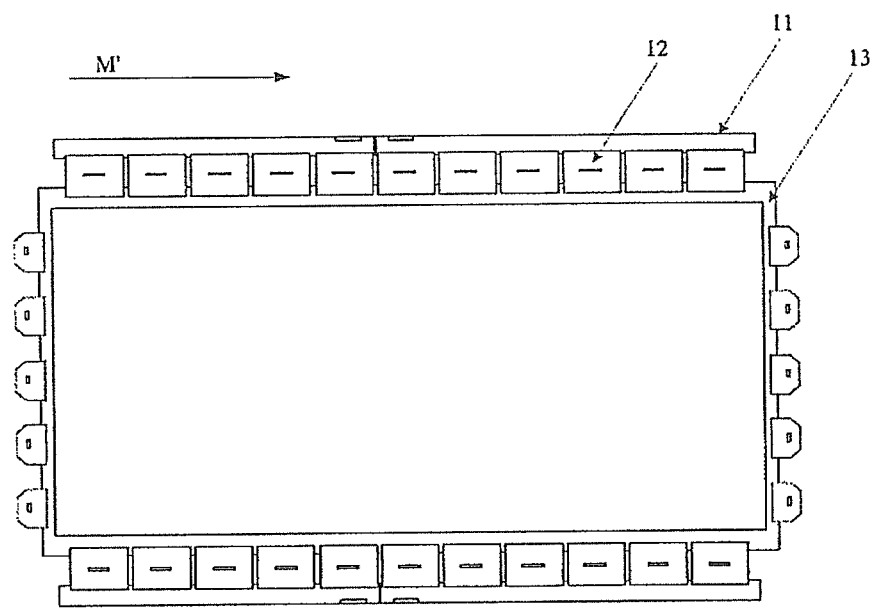
FIG. 1 is a schematic view of a traditional liquid crystal display.
Figure 2:
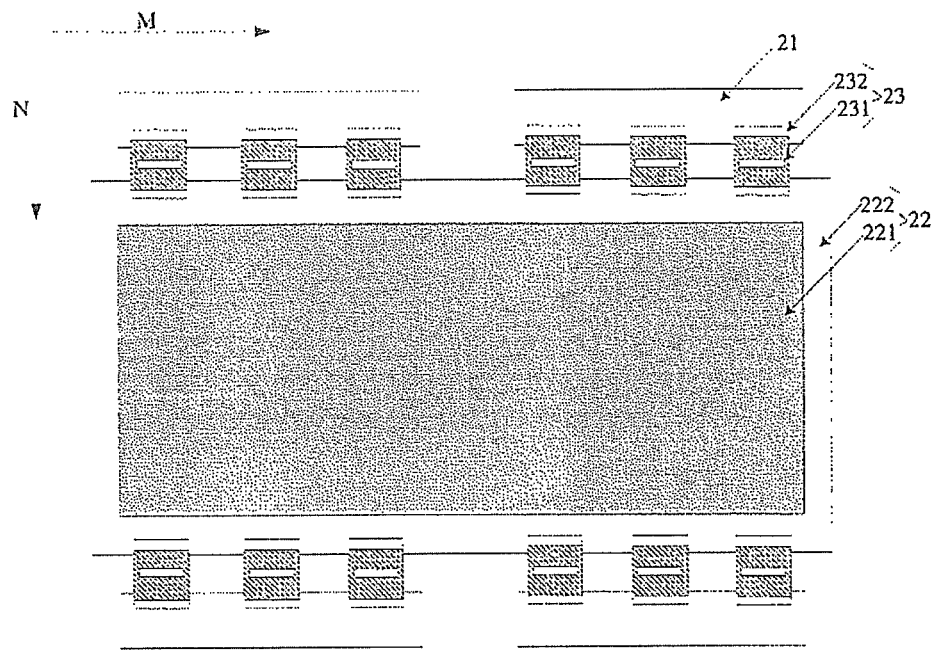
FIG. 2 is a schematic view of a liquid crystal display according to a preferred embodiment of the present invention.

Referring to FIG. 2, FIG. 2 is a schematic view of a liquid crystal display according to a preferred embodiment of the present invention. The liquid crystal display comprises a driving circuit board 21, a liquid crystal pane 22 and a plurality of connecting units 23.

The driving circuit board 21 is extended along a transverse direction M, the connecting units 23 are arranged along the transverse direction M, and each of the connecting units 23 connected with the driving circuit board 21 and the liquid crystal panel 22, respectively.

In the embodiment of the present invention, each of the connecting units 23 comprises at least two chip tapes, for instance, two, three or more chip tapes, wherein the chip tapes are overlapped/covered (see FIG. 5), and connected to the driving circuit board 21 and the liquid crystal panel 22. Each of the chip tapes has a length along the transverse direction M, the length of the chip tapes are the same or different, preferably are the same. Each of the chip tapes has a different width along a longitudinal direction N vertical to the transverse direction M, so that the chip tapes can be overlapped with each other. An interval is existed between two of the adjacent chip tapes in each of the connecting units 23 to avoid that the chip tapes in the same connecting unit 23 are in contact with each other.

For a detailed description of the present invention, the embodiment will be described by an example that the connecting unit 23 only comprises two chip tapes.

Figure 3:
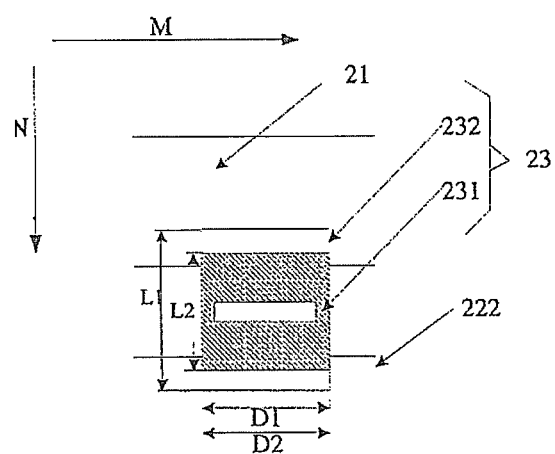
FIG. 3 is a partial schematic view according to FIG. 2.

Referring to FIG. 2 and FIG. 3, the connecting unit 23 only comprising two chip tapes is described in FIG. 2 and FIG. 3, in specific implementations, the connecting unit 23 also can comprise three, four, and more chip tapes within the scope of the present invention.

The connecting unit 23 comprises a first chip tape 231 and a second chip tape 232, and the first chip tape 231 is overlapped/covered with the second chip tape 232. The first chip tape 231 has a first length D1 along the transverse direction M, the second chip tape 232 has a second length D2, preferably the first length D1 is equal to the second length D2.

The first chip tape 231 has a first width L1 along the longitudinal direction N, and the second chip tape 232 has a second width L2, wherein the second width L2 is longer than the first width L1, so that the first chip tape 231 is overlapped/covered with the second chip tape 232.

Figure 5:
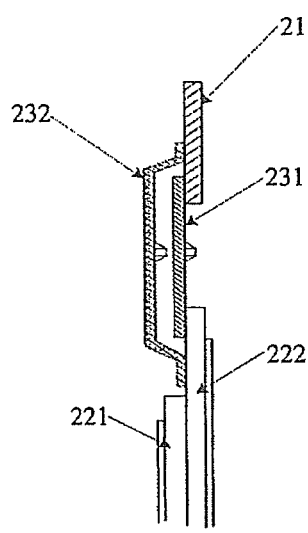
FIG. 5 is a side view according to FIG. 3.

Furthermore, in the embodiment of the present invention, ends of the second chip tape 232 are formed to be a bent shape for covering on the first chip tape 231. Referring to FIG. 5, FIG. 5 is a side view according to FIG. 3, wherein the first chip tape 231 is overlapped/covered with the second chip tape 232.

Figure 4:
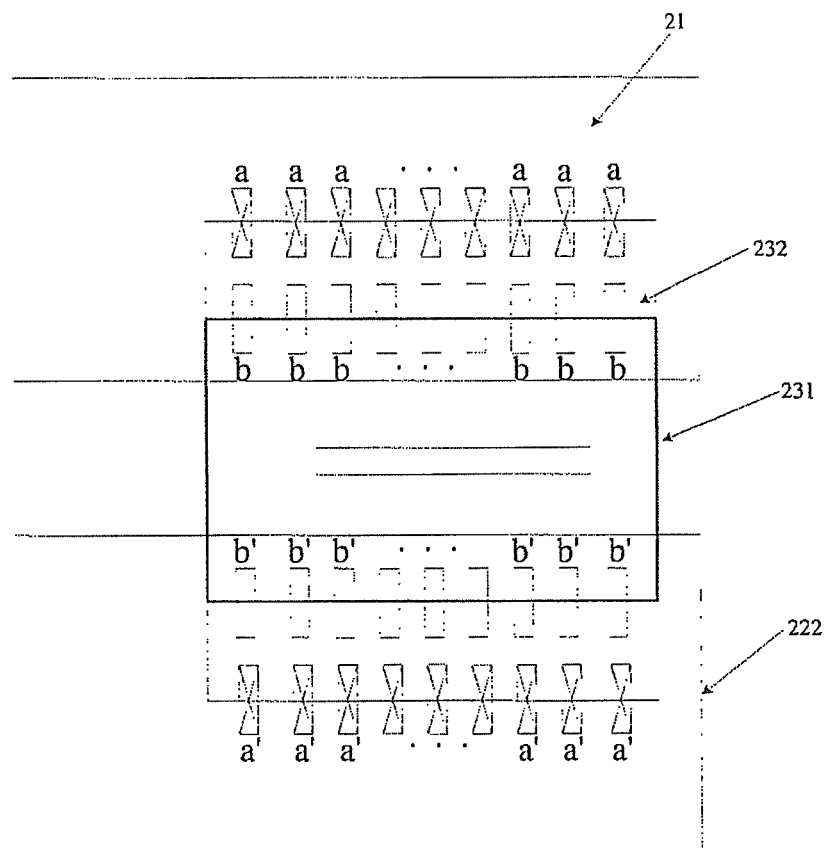
FIG. 4 is a enlarge schematic view according to FIG. 3.

Referring to FIG. 4, the first chip tape 231 and the second chip tape 232 are connected with the driving circuit board 21 and the liquid crystal panel 22 respectively, in the embodiment of the present invention, the driving circuit board 21 is provided with two rows of the terminals, a first row of outer terminals (a) and a first row of inner terminals (b), respectively, the liquid crystal panel 22 is correspondingly provided with two rows of the terminals, i.e. a second row of outer terminals (a') and a second row of inner terminals (b'), respectively.

In the embodiment of the present invention, the liquid crystal panel 22 comprises a first substrate 221, such as color filter (CF) substrate, and a second substrate 222, such as thin film transistor (TFT) substrate, wherein the second row of outer terminals (a') and the second row of inner terminals (b') are formed on the second substrate 222 in FIG. 4.

Therefore, when the first chip tape 231 and the second chip tape 232 are fixed, the internal first chip tape 231 is connected with the first row of inner terminals (b) and second row of inner terminals (b'), and the external second chip tape 232 is connected with the first row of outer terminals (a) and the second row of outer terminals (a'). Because of the ends of the second chip tape 232 is formed to be a bent shape and the second width L2 of the second chip tape 232 is longer than the first width L1 of the first chip tape 231, the second chip tape 232 can be spanned across the first chip tape 231, so that the second chip tape 232 and the first chip tape 231 are spaced from and not in contact with each other to avoid the signal interference.

The embodiment of the present invention is also to provide a liquid crystal display apparatus, wherein the liquid crystal display apparatus comprises a liquid crystal display provided by the above-mentioned embodiment of the present invention, which has been described in detail above and thus does not mentioned hereinafter.

In the embodiment of the present invention, a plurality of connecting units are disposed between the driving circuit board and the liquid crystal panel, each of the connecting units comprises at least two chip tapes being overlapped/covered with each other and connected to the driving circuit board and the liquid crystal panel, the two chip tapes are commonly formed on one of the connecting units based on the design the connecting units, so that the arrangement space of the chip tapes along an extending direction of the driving circuit board can be reduced, and it can be facilitated to do other designs, for example, to weld the chip tapes or to add other apparatus.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A liquid crystal display, comprising:
    a driving circuit board extending along a transverse direction;
    a liquid crystal panel;
    a plurality of connecting units disposed between the driving circuit board and the liquid crystal panel to connect with the driving circuit board and the liquid crystal panel, and the connecting units are arranged along the transverse direction, wherein each of the connecting units comprises:
    at least two chip tapes including a first chip tape and a second chip tape overlapped with each other and connected to the driving circuit board and the liquid crystal panel, wherein the second chip tape has a width along a longitudinal direction vertical to the transverse direction, and the width of the second chip tape is greater than that of the first chip tape; the first chip tape has a first length along the transverse direction, the second chip tape has a second length along the transverse direction, and the first length is equal to the second length;
    wherein at least two first rows of terminals are arranged in parallel along the transverse direction on the driving circuit board, and each of the first rows of terminals includes a first row of outer terminals and a first row of inner terminals arranged along the longitudinal direction on the driving circuit board; at least two second rows of terminals are arranged in parallel along the transverse direction on the liquid crystal panel, and each of the second rows of terminals includes a second row of outer terminals and a second row of inner terminals arranged along the longitudinal direction on the liquid crystal panel;
    wherein the first chip tape and the second chip tape for each of the connecting units are connected to the driving circuit board by the first row of inner terminals and the first row of outer terminals on the driving circuit board, respectively, and connected to the liquid crystal panel by the second row of inner terminals and the second row of outer terminals, respectively; and wherein the liquid crystal panel comprises a color filter substrate, and a thin film transistor substrate, wherein the second row of outer terminals and the second row of inner terminals are formed on the thin film transistor.

2. The liquid crystal display according to claim 1, wherein the driving circuit board is provided with two rows of the terminals, while the liquid crystal panel is provided with two rows of the terminals, each of the connecting units comprises a first chip tape and a second chip tape, and ends of the second chip tape are bended to cover the first chip tape.

3. A liquid crystal display, comprising:
a driving circuit board extending along a transverse direction;
a liquid crystal panel;
a plurality of connecting units disposed between the driving circuit board and the liquid crystal panel to connect with the driving circuit board and the liquid crystal panel, and the connecting units are arranged along the transverse direction, wherein each of the connecting units comprises:
at least two chip tapes including a first chip tape and a second chip tape overlapped with each other and connected to the driving circuit board and the liquid crystal panel, wherein the second chip tape has a width along a longitudinal direction vertical to the transverse direction, and the width of the second chip tape is greater than that of the first chip tape; the first chip tape has a first length along the transverse direction, the second chip tape has a second length along the transverse direction, and the first length is equal to the second length;
wherein at least two first rows of terminals are arranged in parallel along the transverse direction on the driving circuit board, and each of the first rows of terminals includes a first row of outer terminals and a first row of inner terminals arranged along the longitudinal direction on the driving circuit board; at least two second rows of terminals are arranged in parallel along the transverse direction on the liquid crystal panel, and each of the second rows of terminals includes a second row of outer terminals and a second row of inner terminals arranged along longitudinal direction on the liquid crystal panel;
wherein the first chip tape and the second chip tape for each of the connecting units are connected to the driving circuit board by the first row of inner terminals and the first row of outer terminals on the driving circuit board, respectively, and connected to the liquid crystal panel by the second row of inner terminals and the second row of outer terminals, respectively;
wherein the liquid crystal panel comprises a color filter substrate, and a thin film transistor substrate, wherein the second row of outer terminals and the second row of inner terminals are formed on the thin film transistor substrate; and
wherein an interval is existed between two of the adjacent chip tapes.

4. The liquid crystal display according to Claim 3, wherein the driving circuit board is provided with two rows of the terminals, while the liquid crystal panel is provided with two rows of the terminals, each of the connecting units comprises a first chip tape and a second chip tape, and ends of the second chip tape are bent to cover the first chip tape.

5. A liquid crystal display apparatus, comprising a liquid crystal display, wherein the liquid crystal display comprises:
a driving circuit board extending along a transverse direction;
a liquid crystal panel;
a plurality of connecting units disposed between the driving circuit board and the liquid crystal panel to connect with the driving circuit board and the liquid crystal panel, and the connecting units are arranged along the transverse direction, wherein each of the connecting units comprises:
at least two chip tapes including a first chip tape and a second chip tape overlapped with each other and connected to the driving circuit board and the liquid crystal panel, wherein the second chip tape has a width along a longitudinal direction vertical to the transverse direction, and the width of the second chip tape is greater than that of the first chip tape; the first chip tape has a first length along the transverse direction, the second chip tape has a second length along the transverse direction, and the first length is equal to the second length;
wherein at least two first rows of terminals are arranged in parallel along the transverse direction on the driving circuit board, and each of the first rows of terminals includes a first row of outer terminals and a first row of inner terminals arranged along the longitudinal direction on the driving circuit board: at least two second rows of terminals are arranged in parallel along the transverse direction on the liquid crystal panel, and each of the second rows of terminals includes a second row of outer terminals and a second row of inner terminals arranged along the longitudinal direction on the liquid crystal panel;
wherein the first chip tape and the second chip tape for each of the connecting units are connected to the driving circuit board by the first row of inner terminals and the first row of outer terminals, respectively, and connected to the liquid crystal panel by the second row of inner terminals and the second row of outer terminals, respectively;
wherein the liquid crystal panel comprises a color filter substrate, and a thin film transistor substrate, wherein the second row of outer terminals and the second row of inner terminals are formed on th thin film transistor substrate.

6. The liquid crystal display apparatus according to claim 5, wherein there is an interval between the two adjacent chip tapes.

7. The liquid crystal display apparatus according to Claim 5, wherein the driving circuit board is provided with two rows of the terminals, while the liquid crystal panel is provided with two rows of the terminals, each of the connecting units comprises a first chip tape and a second chip tape, and ends of the second chip tape are bent to cover the first chip tape.

* * * * *